United States Patent [19]

Forson et al.

[11] Patent Number: 5,022,070
[45] Date of Patent: * Jun. 4, 1991

[54] SWITCH-ADJUNCT INTERFACE

[75] Inventors: Henry M. Forson, Annandale, Va.; John R. Lothrop; Thomas M. O'Dell, both of Longmont, Colo.; Rick L. Overmyer, Golden, Colo.

[73] Assignee: AT&T Bell Laboratories, Murray Hill, N.J.

[*] Notice: The portion of the term of this patent subsequent to Dec. 25, 2007 has been disclaimed.

[21] Appl. No.: 579,454

[22] Filed: Sep. 7, 1990

Related U.S. Application Data

[63] Continuation of Ser. No. 486,676, Feb. 27, 1990, Pat. No. 4,980,906.

[51] Int. Cl.⁵ .................... H04M 11/06; H04M 1/64; H04M 1/57
[52] U.S. Cl. ........................ 379/32; 379/28; 379/2
[58] Field of Search ............. 379/32, 28, 2, 93, 94

[56] References Cited

U.S. PATENT DOCUMENTS 4,606,044  8/1986  Kudo .................... 379/28 X

OTHER PUBLICATIONS

*Interface Description–Interface Between Customer Premise Equipment Simplified Message Desk– And Switching System–1AESS*, Bell Communications Research Technical Reference TR-TSY-000283 (Jul. 1985).

Primary Examiner—Stafford D. Schreyer
Attorney, Agent, or Firm—David Volejnicek

[57] ABSTRACT

The functionality of the SMSI protocol is extended by adding to the SMSI protocol messages having the same format as the conventional SMSI protocol messages but implementing leave word calling functions for a voice message system adjunct processor and integrating maintenance functions of an adjunct processor and an SMSI protocol-to-non-SMSI protocol converter.

37 Claims, 11 Drawing Sheets

700 | <S><C><A><SP><L><I><G><H><T><SP> | <X><X><X> | <!> | <CTRL><D>
     |              301                |    302    | 305 |    303

900 | <CR><LF> | <L><O><S><T><SP><I><S><D><N><SP><M><S><G> | | <CR><LF> | <CTRL><Y>
    |   204   |                  201                      | 202 |  205   |    203

1000 | <CR><LF> | <L><O><S><T><SP><A><U><D><I><X><SP><M><S><G> | | <CR><LF> | <CTRL><Y>
     |   204   |                  201                         | 202 |  205   |    203

1100 | <CR><LF> | <I><S><D><N><SP><D><I><S><SP><R><E><Q> | | <CR><LF> | <CTRL><Y>
     |   204   |                  201                   | 202 |  205   |    203

1200 | <CR><LF> | <I><S><D><N><SP><E><S><T><SP><R><E><Q> | | <CR><LF> | <CTRL><Y>
     |   204   |                  201                   | 202 |  205   |    203

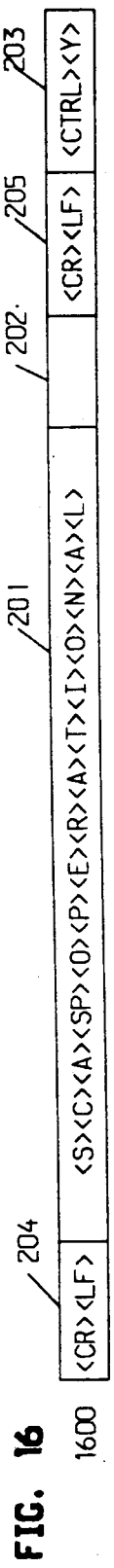
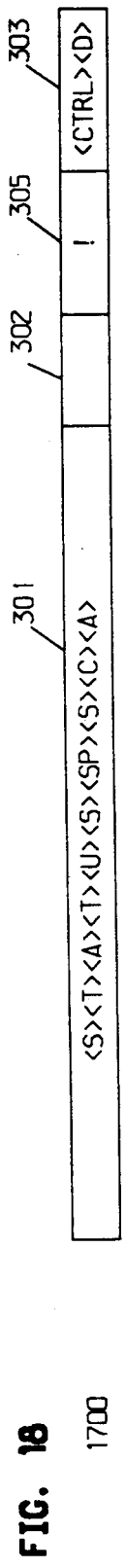
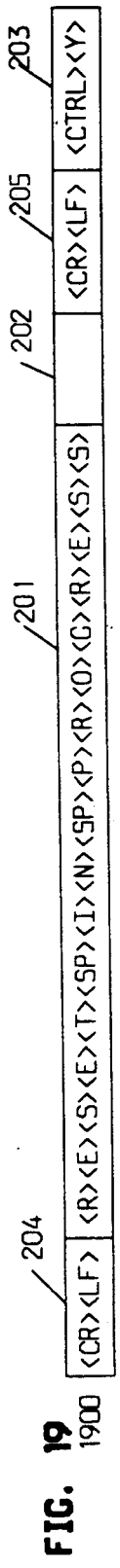
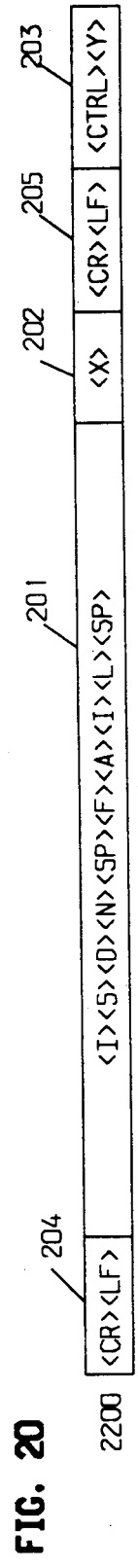
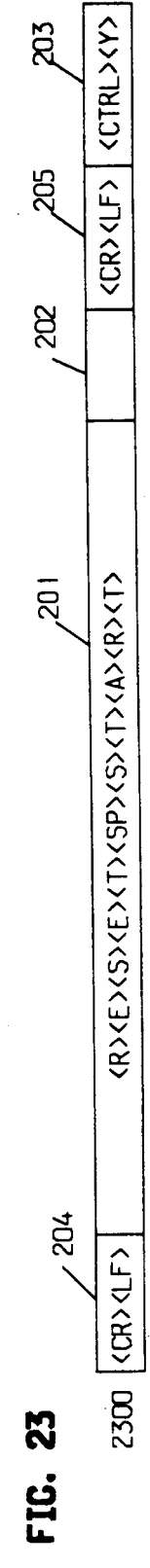

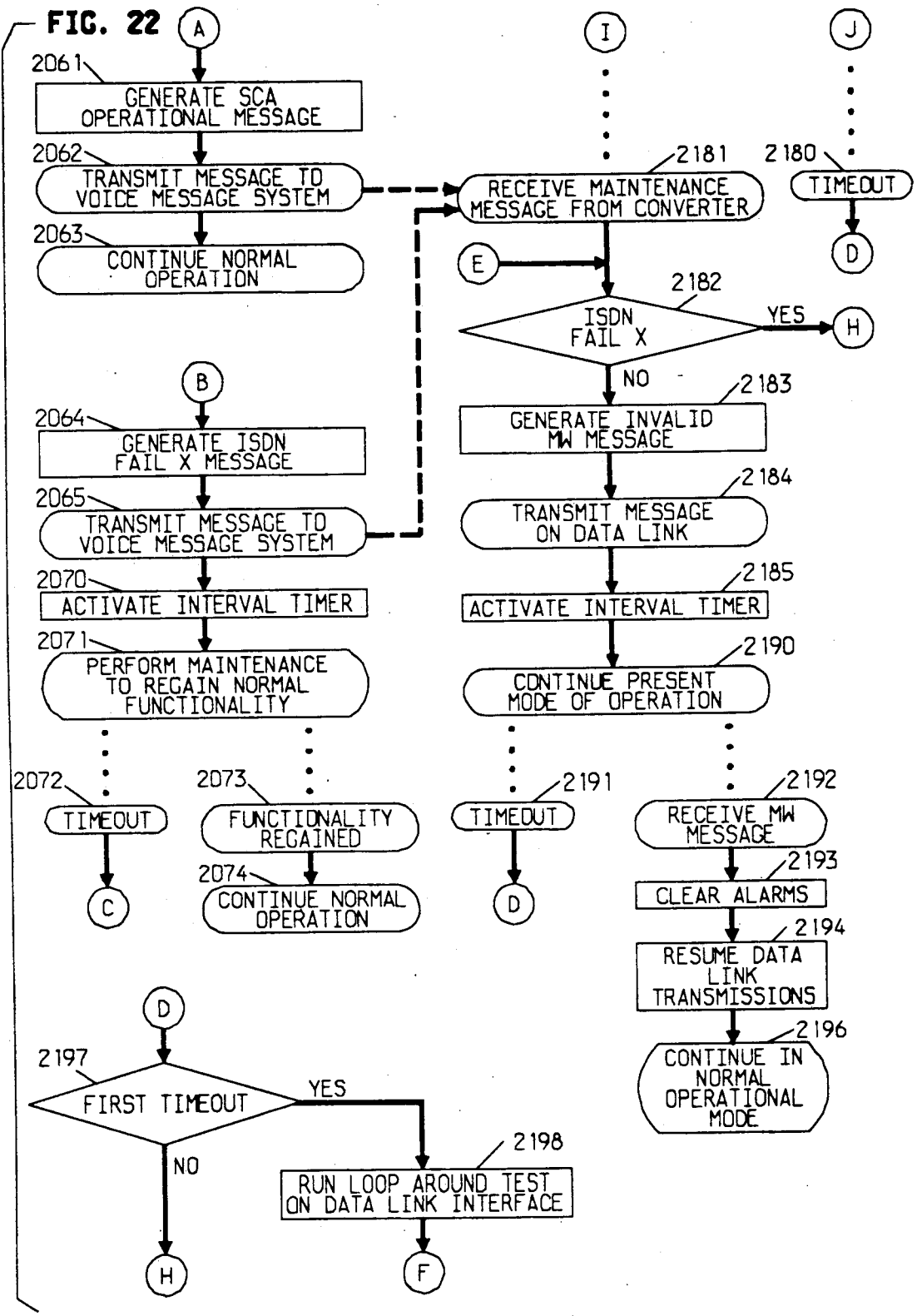

SWITCH-ADJUNCT INTERFACE

CROSS REFERENCE TO RELATED APPLICATION

This is a continuation of application Ser. No. 07/486,676, filed on Feb. 27, 1990, now U.S. Pat. No. 4,980,906.

TECHNICAL FIELD

This invention relates to the SMSI protocol used for data communications between telecommunication switches and adjunct processors.

BACKGROUND OF THE INVENTION

The simplified message service interface (SMSI) protocol, also known as the simplified message desk interface (SMDI) protocol, is a standard protocol for data communications between telecommunications switches, such as telephony central office switches and PBXs, and adjunct processors, such as voice message systems. One of the principal advantages of the SMSI protocol over other protocols is that it is very simple and easy to implement-particularly, its format is very simple and effective. However, a significant disadvantage of the SMSI protocol is that it provides only very limited functionality: the protocol defines only three message types, one of which is used by the switch to provide information about a call to an adjunct processor, a second one of which is used by the adjunct processor to activate or deactivate a message-waiting indicator on the switch, and the third one of which is used by the switch to indicate to the adjunct processor a failure of a message of the second type.

A popular feature of switches and electronic message systems is the leave-word-calling (LWC) feature. It allows a caller to leave a call-back message for a called party by dialing the called party's telephone number and pressing the LWC feature button on the caller's telephone set. The called party is then informed (for example, by means of a message-waiting indicator) that he or she has received a message. When the called party retrieves the message, it informs him or her of the calling party's telephone number and optionally of other information such as the calling party's name and the time of the call. Unfortunately, the SMSI protocol does not include functionality to implement the LWC feature.

In order to provide functionality suitable for implementing features such as the LWC feature, some telecommunication switches use protocols to communicate with the outside world that are functionally much richer than the SMSI protocol. Unfortunately, these protocols are also much more complex and difficult to implement, and so have not been widely adopted by adjunct processors. Consequently, protocol converters are used to interface such adjunct processors to such switches. In such cases, the protocol converters translate messages between the SMSI protocol used by the adjunct processors and the protocols used by the switches. Messages of the non-SMSI protocols that do not have counterparts in the SMSI message set are ignored and dropped by the converters. Consequently, functionality in addition to that provided by the SMSI protocol cannot be implemented in this manner, and the additional functionality of the non-SMSI protocols is wasted.

Furthermore, in many communication systems, and particularly in public telecommunication systems, it is common to have extensive maintenance facilities that serve to test the systems, to detect errors in the systems, and to recover the systems from errors. The maintenance facilities typically rely on extensive communications between various portions of the telecommunication system. Unfortunately, however, the SMSI protocol does not include functionality to implement maintanance communications, and thereby severely inhibits both maintenance of the link that connects the adjunct processor with the protocol converter and the integration of the maintenance of the adjunct processor and the protocol converter.

SUMMARY OF THE INVENTION

The invention is directed to alleviating these and other disadvantages of the prior art. According to the invention, the SMSI protocol is enhanced to provide additional functionality for implementing features such as leave-word-calling and maintenance. Additional messages are added to the SMSI protocol which, significantly, retain the format of the conventional SMSI message types but cleverly distinguish from the conventional messages, specifically by the ASCII character strings contained in their message ID field. Also according to the invention, an adjunct processor that communicates using the SMSI protocol is enhanced to integrate its maintenance facilities with the maintenance of a protocol converter, through the use between them of the enhanced SMSI protocol.

These and other advantages and features of the present invention will become more apparent from the following discussion of an illustrative embodiment of the invention taken together with the drawing.

BRIEF DESCRIPTION OF THE DRAWING

FIG. 8 is a flow diagram of the operations performed by the protocol converter and the voice message system of FIG. 1 in using the messages of FIG. 7;

FIG. 16 is a diagram of another maintenance message sent by the protocol converter of FIG. 1 to the voice message system of FIG. 1;

FIGS. 18–20 are diagrams of further maintenance messages exchanged between the protocol converter and the voice message system of FIG. 1;

FIGS. 21–22 are flow diagrams of the operations performed by the protocol converter and the voice message system of FIG. 1 in using the messages of FIGS. 18–20;

FIG. 23 is a diagram of another maintenance message sent by the protocol converter of FIG. 1 to the voice message system of FIG. 1.

DETAILED DESCRIPTION

Figure 1:
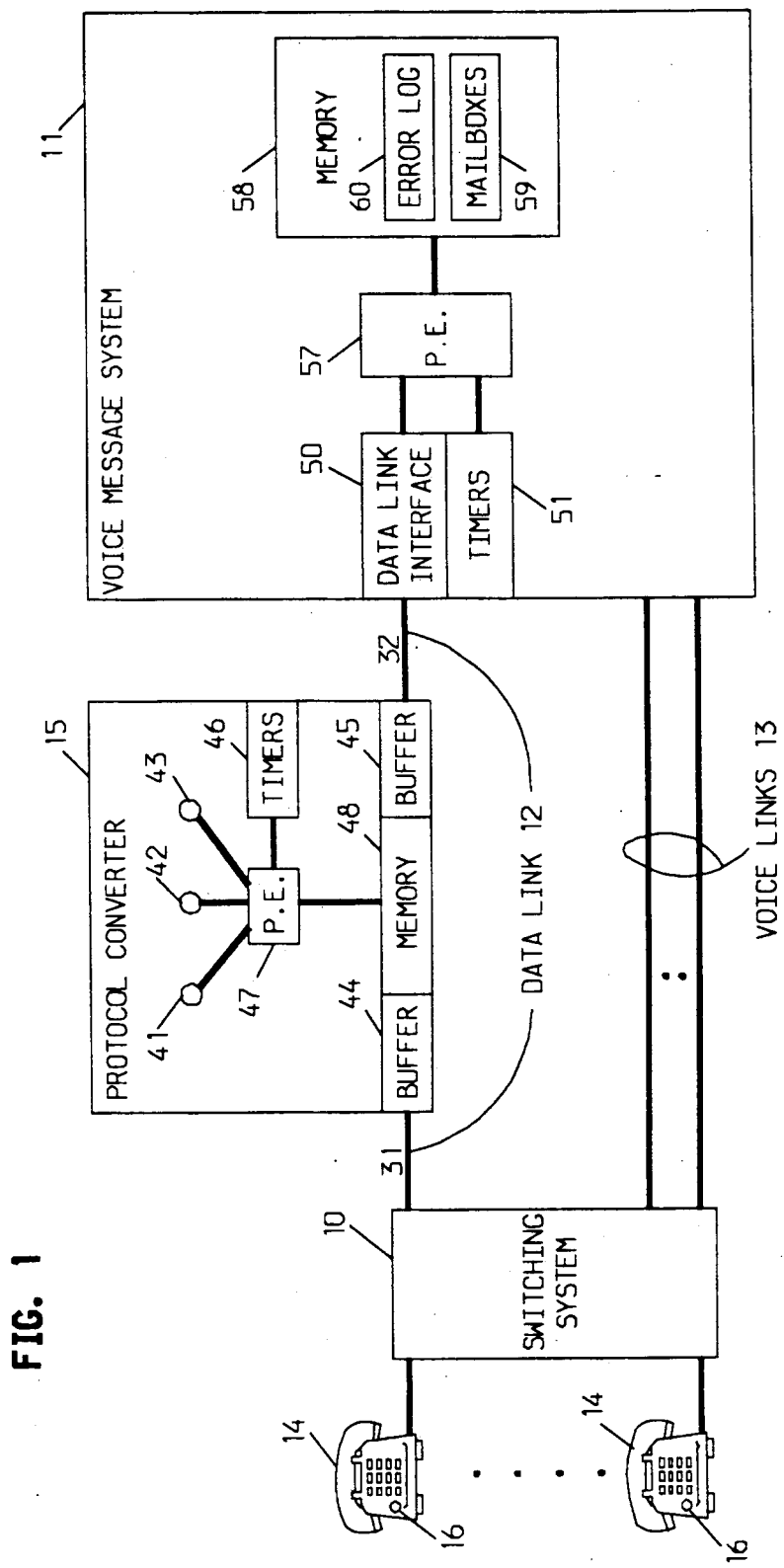
FIG. 1 is a block diagram of an illustrative communication system that includes an embodiment of the invention.

FIG. 1 shows an illustrative communication system that serves as an environment for the invention. A switching system 10, such as a telephone central office or a private branch exchange (PBX), provides communications services for a plurality of connected telephones 14 and their users. Services that are not provided by switching system 10 and its intelligence directly are provided indirectly via one or more applications processors that are connected to the switching system. One such service is a voice message service, provided by an applications processor aptly referred to as a voice message system 11. For purposes of this application, voice message system 11 is taken to be representative of all applications processors.

Voice message system 11 is connected to switching system 10 by a data link 12 and a plurality-a hunt group-of voice links 13. Switching system 10 and voice message system 11 use data link 12 to communicate to each other control information and data pertaining to voice communications on voice links 13. Systems 10 and 11 use differing higher-level communication protocols on data link 12. Illustratively, switching system 10 is the 5ESS ® switching system of AT&T, which uses the attached processor interface (API) protocol for communicating with adjunct processors. In this instance, voice message system 11 uses the SMSI protocol for communicating with switching system 10. Hence, a protocol converter 15 is interposed in data link 12 between systems 10 and 11 to provide conversion between the non-SMSI (e.g., API) protocol used on portion 31 of link 12 and the SMSI protocol used on portion 32 of link 12. Protocol converter 15 is illustratively either the AT&T Switch Communications Adapter (SCA) protocol converter or an enhanced version of the AT&T 3A Translator protocol converter, either one of which converts between the SMSI and the API protocols.

As shown, protocol converter 15 includes a plurality of indicators such as LEDs 41–43, a pair of buffers 44,45 for temporarily storing messages received on link 12 portions 31 and 32, respectively, and a plurality of interval timers 46. System 11 also includes a plurality of interval timers 51. System 11 is interfaced to data link 12 by a conventional data link interface 50. Both converter 15 and system 11 are processor-controlled entities, and each includes its own processing element (P.E.) 47,57 and an associated memory 48,58 that stores software routines executable by element 47,57 for controlling the operation of converter 15 and system 11. Memory 58 of system 11 also contains mailboxes 59 of subscribers to system 11 services, and stores a conventional error log 60 used for maintenance of system 11.

Figure 2:
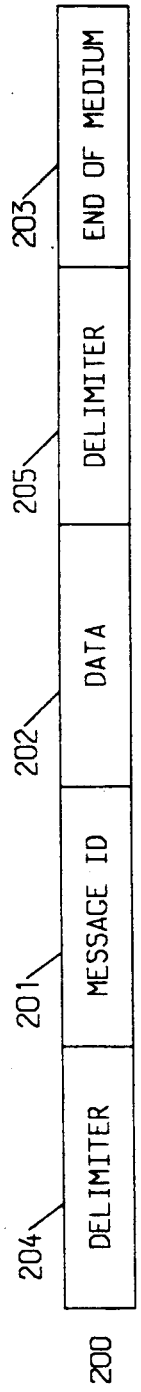
FIG. 2 is a block diagram of the format of SMSI messages sent to an adjunct processor.
Figure 3:
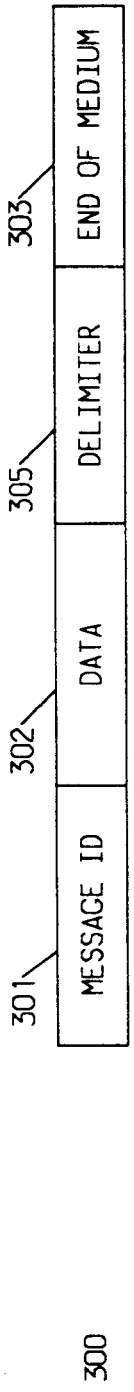
FIG. 3 is a block diagram of the format of SMSI messages sent from an adjunct processor.

The conventional SMSI protocol is described in detail in *Interface Description-Interface Between Customer Premise Equipment-Simplified Message Desk-and Switching System*-1AESS, Bell Communications Research Technical Reference TR-TSY-000283 (July 1985), which is hereby incorporated herein by reference. The messages of the SMSI protocol have a common general format: a message identifier (ID) field that identifies which one of the message types it is, and a data field that carries transaction-related information, accompanied by marking fields. However, the specific format of SMSI messages sent to an adjunct processor differs slightly from the specific format of SMSI messages sent from an adjunct processor. Specifically, as shown in FIG. 2, message 200 sent to an adjunct comprises a pair of marking fields, referred to as delimiter fields 204,205, that enclose message ID field 201 and data field 202. Each field 204,205 illustratively includes the carriage return <CR> and the line feed <LF> ASCII character sequence. The message 200 is terminated by a marking field, referred to as an end-of-medium field 203, that designates the end of the message. Field 203 illustratively includes the <CTRL><Y> ASCII character sequence. As shown in FIG. 3, message 300 sent from an adjunct differs in format from a message 200 in that it lacks an initial delimiter field. Thus, message 300 comprises a message ID field 301 and a data field 302 followed by a delimiter field 305. Field 305 illustratively includes the exclamation mark <!> ASCII sequence. Message 300 is terminated by an end-of-medium field 303 that illustratively includes the <CTRL><D> ASCII character sequence. This sequence is also commonly referred to as an end-of-transmission sequence.

The conventional SMSI protocol consists of the following four messages: a connect message, two message waiting update messages and an invalid message waiting message, each of which will now be described.

A connect message, sent from switching system 10 to voice message system 11, is identified by ASCII characters <M><D> in message ID field 201 and includes data in data field that identifies: the message desk (a physical position) and port number on system 10 of voice link 13 that carries the call to which the connect message relates, the calling telephone number, the called telephone number, and the call type (the reason for redirection of the call from the called number of system 11).

A first message waiting update (MW) message, sent from system 11 to system 10, is identified by ASCII characters <O><P><:><M><W><I> in message ID field 301 and includes data in data field 302 that identifies the number of telephone 14 whose message waiting indicator 16 is to be turned on.

A second message waiting update (MW) message, also sent from system 11 to system 10, is identified by ASCII characters <R><M><V><:><M><W><I> in message ID field 301 and includes data in data field 302 that identifies the number of telephone 14 whose message waiting indicator 16 is to be turned off.

An invalid message waiting (IMW) message, sent from system 10 to system 11 in case of failure of the task specified by an MW message, is identified by ASCII characters <M><W><I> in message ID field 201 and includes data in data field 202 that identifies: the number of telephone 14 whose message waiting indicator 16 was to be controlled, and the reason for the task's failure, namely, whether the telephone number was invalid or whether the performance of the task was blocked by system 10 being too busy. Conventionally, all of these messages are sent between systems 10 and 11 without any acknowledgment. Each system 10,11 responds to receipt of an SMSI protocol message by taking predetermined action.

Figure 4:
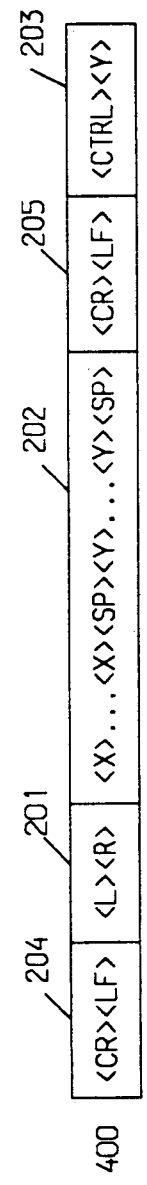
FIGS. 4 and 5 are diagrams of leave-word-calling feature messages sent by the protocol converter of FIG. 1 to the voice message system of FIG. 1.
Figure 5:
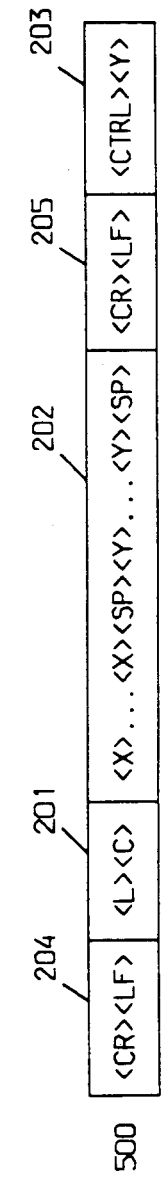

According to a first aspect of the invention, a leave-word-calling (LWC) request message and a leave-word-calling (LWC) cancel feature message are added to the SMSI protocol messages. These messages are formed and sent by protocol converter 15 to system 11 to activate and deactivate, respectively, the LWC feature, in response to receipt by converter 15 of corresponding messages from switching system 10. LWC request message 400 is shown in FIG. 4 and LWC cancel message 500 is shown in FIG. 5. Message 400 is distinguished by having the ASCII character sequence <L><R> in message ID field 201, whereas message 500 is distinguished by having the ASCII character sequence <L><C> in message ID field 201. Both messages 400 and 500 have in data field 202 a variable-length sequence of ASCII characters symbolically represented by <x> that identify the called party number, and a variable-length sequence of ASCII characters symbolically represented by <y> that identify the calling party number. Each sequence of characters <x> and <y> is followed by the ASCII space character <sp>.

Figure 6:
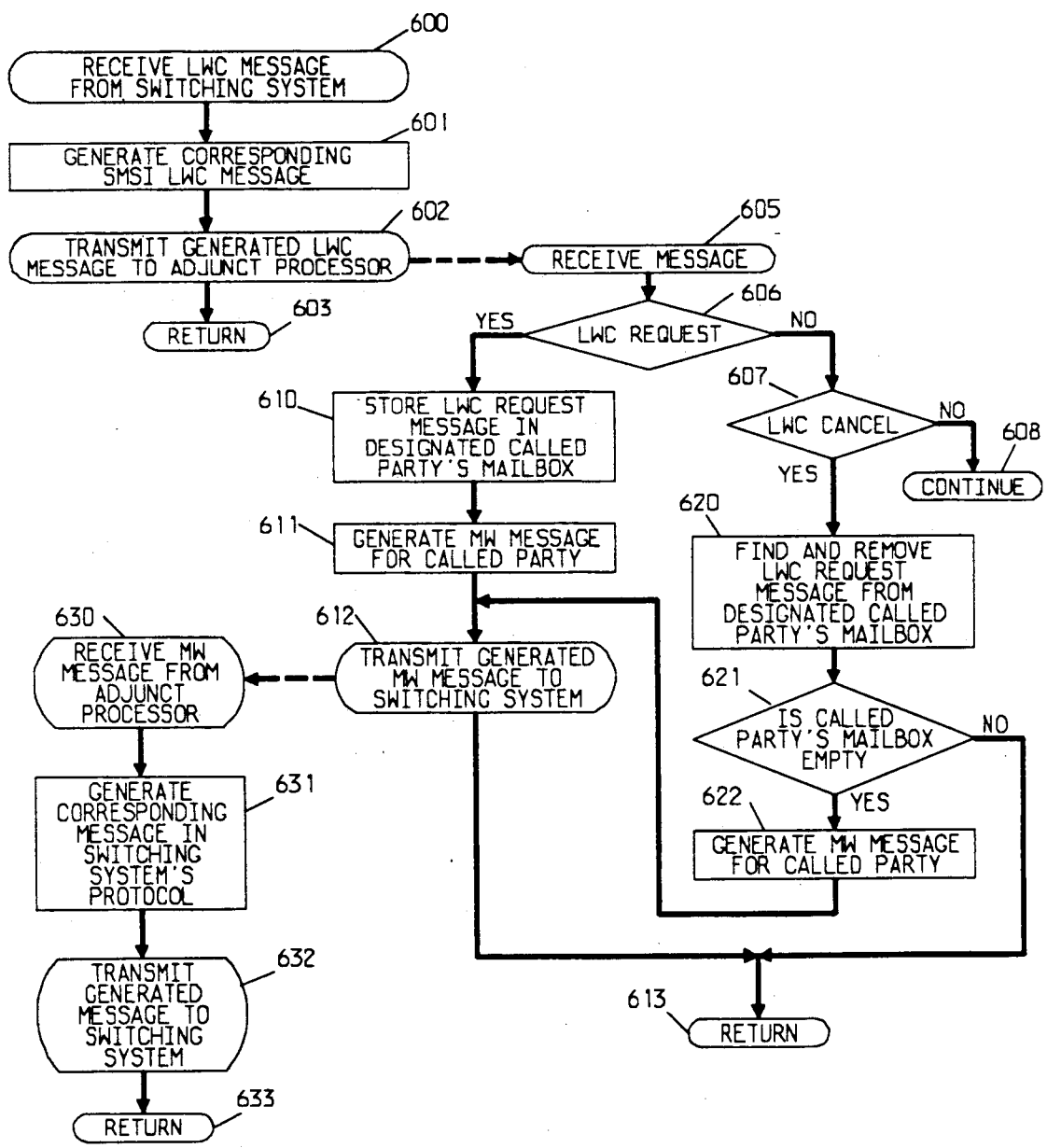
FIG. 6 is a flow diagram of the operations performed by the protocol converter and the voice message system of FIG. 1 in using the messages of FIGS. 4 and 5.

The use made by converter 15 and system 11 of the messages of FIGS. 4 and 5 is illustrated in FIG. 6. In response to its receipt of an LWC message over portion 31 of link 12 from system 10, at step 600, converter 15 generates the corresponding LWC message in the format of FIG. 4 or 5, at step 601. Converter 15 then transmits the generated LWC message over portion 32 of link 12 to system 11, at step 602, and returns to the point of its invocation, at step 603.

System 11 receives the LWC message transmitted by converter 15, at step 605, and determines whether it is an LWC request message 400 or an LWC cancel message 500, at steps 606 and 607; if it's neither, system 11 continues conventional processing, at step 608, to determine the message type and to respond accordingly. If the message is an LWC request message 400, system 11 stores the data contents of the message (the calling party directory number) in mailbox 59 of the called party designated by the message, at step 610, in a conventional manner. System 11 then generates a conventional first MW message for the called party, at step 611, and transmits the generated MW message on link 12, at step 612, to cause the called party's message waiting indicator 16 to be activated. System 11 then returns to the point of its invocation, at step 613.

Returning to steps 606 and 607, if the received message is an LWC cancel message 500, system 11 finds in the called party's mailbox 59 the data contents of the LWC request message 400 previously-received from this caller and removes those contents, if still present, from mailbox 59, at step 620. System 11 then checks whether the called party's mailbox 59 is empty, at step 621. If so, system 11 generates a conventional second MW message for the called party, at step 622, and then proceeds to step 612 to transmit the generated MW message on link 12 to cause the called party's message waiting indicator 16 to be deactivated. If the called party's mailbox 59 is found to be not empty at step 621, system 11 proceeds to step 613.

At step 630, converter 15 receives the MW message transmitted by system 11 at step 612, and in response generates the corresponding message in the protocol used by switching system 10, at step 631. Converter 15 then transmits the generated message to system 10, at step 632, and returns to the point of its invocation, at step 633.

Figures 7, 9, 10, 11, 12:
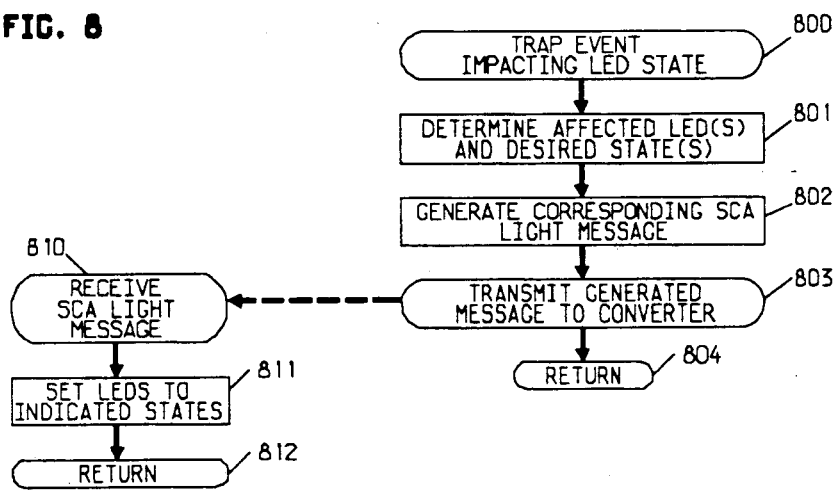
FIG. 7 is a diagram of indicator-control messages sent by the voice message system of FIG. 1 to the protocol converter of FIG. 1.
FIGS. 9-12 are diagrams of spontaneous messages sent by the protocol converter of FIG. 1 to the voice message systems of FIG. 1.

According to a second aspect of the invention, protocol converter 15 is integrated with system 11 for maintenance purpose by maintenance messages added to the conventional SMSI protocol messages. For example, controller 15 includes three LEDs 41-43 or some other suitable indicators. LED 41 serves an ALARM function to indicate a problem with converter 15 that requires craft intervention. LED 42 serves to indicate that a TEST of converter 15 is presently being performed. And LED 43 is used to indicate that converter 15 is operational, i.e., OPERATING normally. While converter 15 has direct access to and control over LEDs 41-43, system 11 uses an SCA LIGHT maintenance message 700, shown in FIG. 7, to control their activation and deactivation through converter 15. SCA LIGHT message 700 is in the format of message 300 of FIG. 3. It has the ASCII character sequence <S><C-><A><sp><L><I><G><H><T><sp> in message ID field 301, and a sequence of three ASCII numerical characters <x> in data field 302. The zero or one value of every character <x> represents the desired, on or off, state of a different LED 41-43.

The use made of the SCA LIGHT message 700 is illustrated in FIG. 8. System 11 traps all events that potentially impact the on or off state of an LED 41-43. Such an event may be, for example, receipt of a maintenance message from converter 15, detection of an error on link 12, or invocation of link 12 test procedures. Upon trapping such an event, at step 800, system 11 determines from the event which one or more LEDs 41-43 have their state potentially affected thereby and what the new state of each should be, at step 801. System 11 then generates an SCA LIGHT message 700 that contains the desired LED 41-43 states, at step 802, and transmits the generated message 700 to converter 15, at step 803. System 11 then returns to the point of its invocation, at step 804.

In response to receipt of SCA LIGHT message 700 from system 11, at step 810, converter 15 sets LEDs 41-43 to the states indicated by that message, at step 811, and then returns to the point of its invocation, at step 812.

Figure 13:
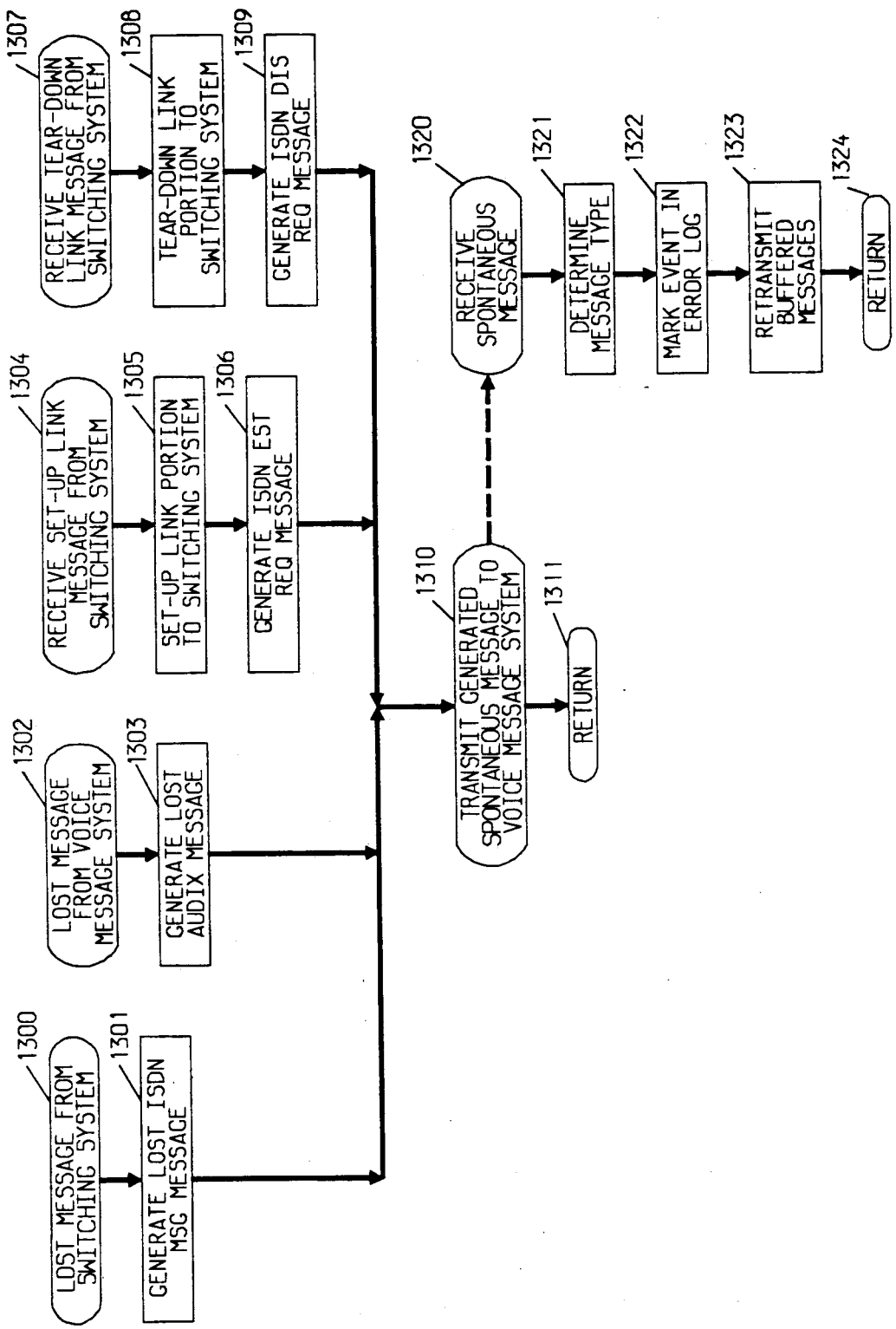
FIG. 13 is a flow diagram of the operations performed by the protocol converter and the voice message system of FIG. 1 in using the messages of FIGS. 9-12.

Controller 15 uses a set of maintenance messages, referred to as spontaneous messages, to inform system 11 of certain events. These messages 900-1200 are shown in FIGS. 9-12. As these Figures show, messages 900-1200 take the form of message 200 of FIG. 2. Their data fields 202 are blank, or null, and they are distinguished by the contents of their message ID fields 201. The use of messages 900-1200 is illustrated in FIG. 13. When converter 15 comes to believe that it has lost a message from switching system 10, at step 1300, it generates message 900, at step 1301. Converter 15 comes to believe that is has lost a message any time it receives only a fragment of a message from system 10 or when it receives a message from system 10 that it cannot understand, i.e., parse. Message 900 illustratively contains the ASCII sequence <L><O><S><T><sp><I><S><D><N><sp><M><S><G> in message ID field 201. Similarly, when converter 15 comes to believe that it has lost a message from system 11, at step 1302, it generates message 1000, at step 1303. Message 1000 illustratively contains the ASCII sequence <L><O><S><T><sp><A><U><D><I><X><sp><M><S><G> in message ID field 201. When converter 15 receives a message from system 10 commanding it to set up or tear down data link 12, at step 1304 or 1307, it responds by setting up or tearing down portion 31 of link 12, at step 1305 or 1308, respectively, and generating message 1100 or 1200, respectively, at step 1306 or 1309. Converter 15 then transmits whatever spontaneous message 900–1200 it generated to system 11, at step 1310, and then returns to the point of its invocation, at step 1311.

System 11 receives the transmitted spontaneous message, at step 1320, determines which one of the spontaneous messages it is, at step 1321, and records a number that identifies the reported event in its conventional error log 60 in order to mark occurrence of the event, at step 1322. System 11 then retransmits on data link 12 all previously-sent buffered messages, at step 1323, and returns to the point of its invocation, at step 1324. An administrator of system 11 may then use the information stored in the error log of system 11, for example, to determine if reported problems with system 11 are true problems or merely link 12 outages requested by switching system 10.

System 11 follows a certain procedure to determine that link 12 is functional. This procedures is described in the co-pending patent application of T. M. O'Dell et al., entitled "Improved Switch-Adjunct Communications Protocol", Ser. No. 07/434,389, filed on Nov. 9, 1989, and assigned to the same assignee as this application. Under this procedure, system 11 periodically—illustratively every 30 seconds-sends to system 10 an MW message whose data field 302 contents are invalid, in order to cause system 10 to respond with an IMW message. If the IMW message is not received by system 11, it assumes that something is wrong with link 12 and it attempts to correct or isolate the failure and then to retransmit all previously-sent messages buffered since the last IMW message was received.

Converter 15 uses this fact that, during normal opeation, transmissions on link 12 occur at least every predetermined time period, to perform its own check on the continued viability of link 12. This procedure is illustrated in FIG. 15. Each time converter 15 receives a message—any message—over data link 12 from system 11, at step 1500, it resets a 5-minute interval timer of timers 46, at step 1501, and then processes the received message as appropriate for that message, at step 1502, before returning to the point of its invocation, at step 1503. If all is well, converter 15 will receive at least one message from system 11 during each 5 minute interval, so the interval timer will never time out. However, if no message from system 11 is received within a 5-minute interval, the timer times out, at step 1505. In response, converter 15 generates an SCA FAIL 2 maintenance message 1400 (shown in FIG. 14), at step 1506, and sends it to system 11, at step 1507, to advise system 11 that something is wrong. Converter 15 then resets itself, in a conventional manner, at step 1508.

Figure 14:
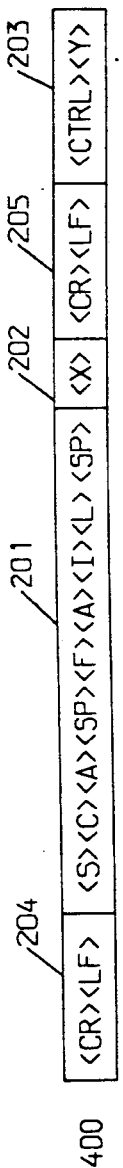
FIG. 14 is a diagram of maintenance messages sent by the protocol converter of FIG. 1 to the voice message system of FIG. 1.
Figure 15:
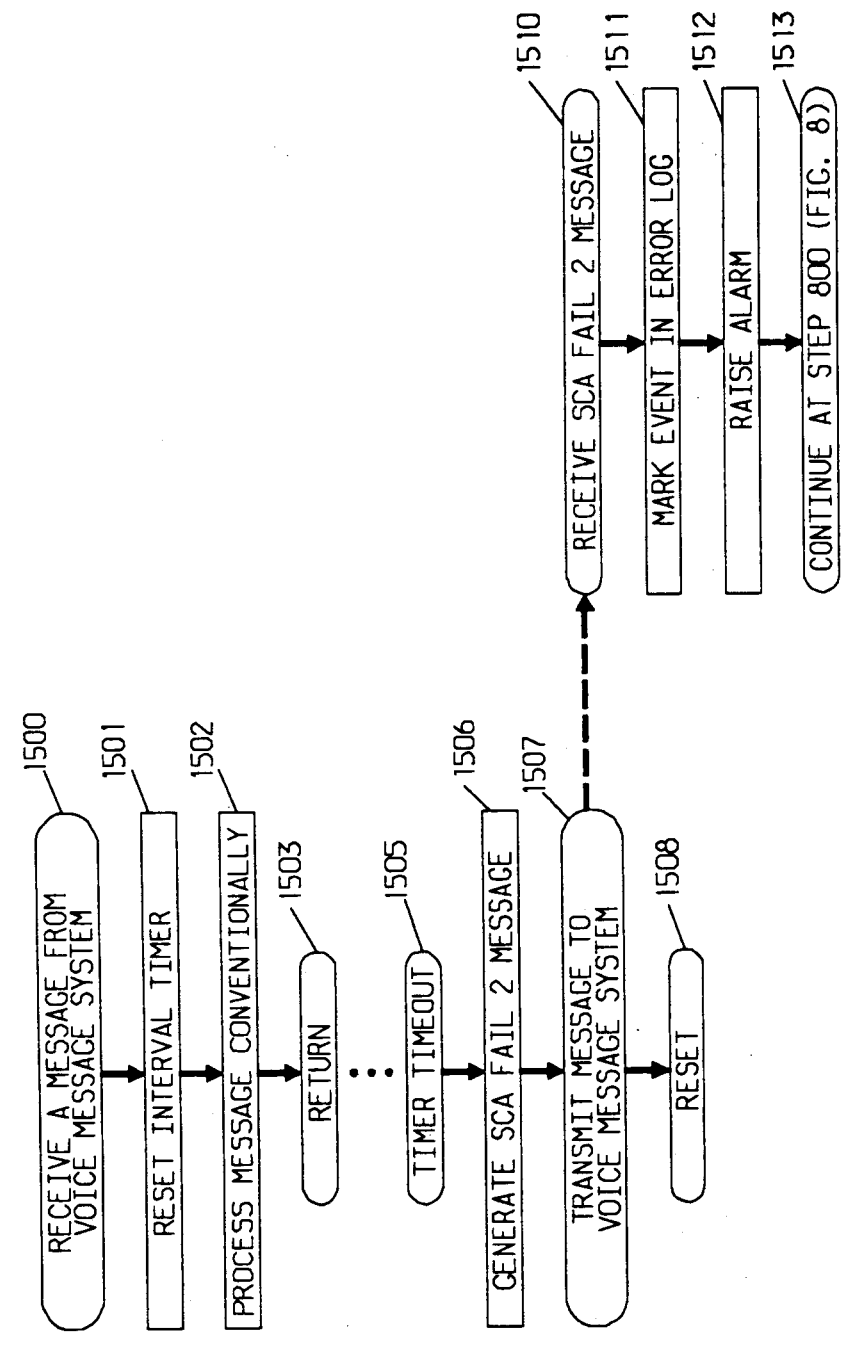
FIG. 15 is a flow diagram of the operations performed by the protocol converter and the voice message system of FIG. 1 in using a message of FIG. 14.

As shown in FIG. 14, maintenance message 1400 takes the form of message 200 of FIG. 2. Its message ID 201 field contains the ASCII character sequence <S><C><A><sp><F><A><I><L><sp>, and its data field 202 contains the ASCII character <2>.

Returning to FIG. 15, in response to receipt of message 1400, at step 1510, system 11 records a number that identifies the reported event in its conventional error log 60, at step 1511, and also, on account of the seriousness of the reported error, raises an alarm to the craft, at step 1512. System 11 then continues operation, commencing at step 800 of FIG. 8, at step 1513, to cause ALARM LED 41 of converter 15 to be turned on.

Converter 15 includes a pair of buffers (44,45) one for holding messages received from system 10 and the other for holding messages received from system 11, respectively, that have not yet been processed and disposed of by converter 15. Converter 15 communicates with system 11 via a pair of maintenance messages shown in FIGS. 14 and 16 to manage buffer 45 for messages from system 11 and to keep it from overflowing. Message 1400, shown in FIG. 14, now contains the ASCII character <1> in its data field 202. Message 1600, shown in FIG. 16, takes the form of message 200 of FIG. 2. It contains the ASCII character sequence <S><C><A><sp><O><P><E><R><A><T><I><O><N><A><L> in its message ID field 201, and has a null data field 202.

Figure 17:
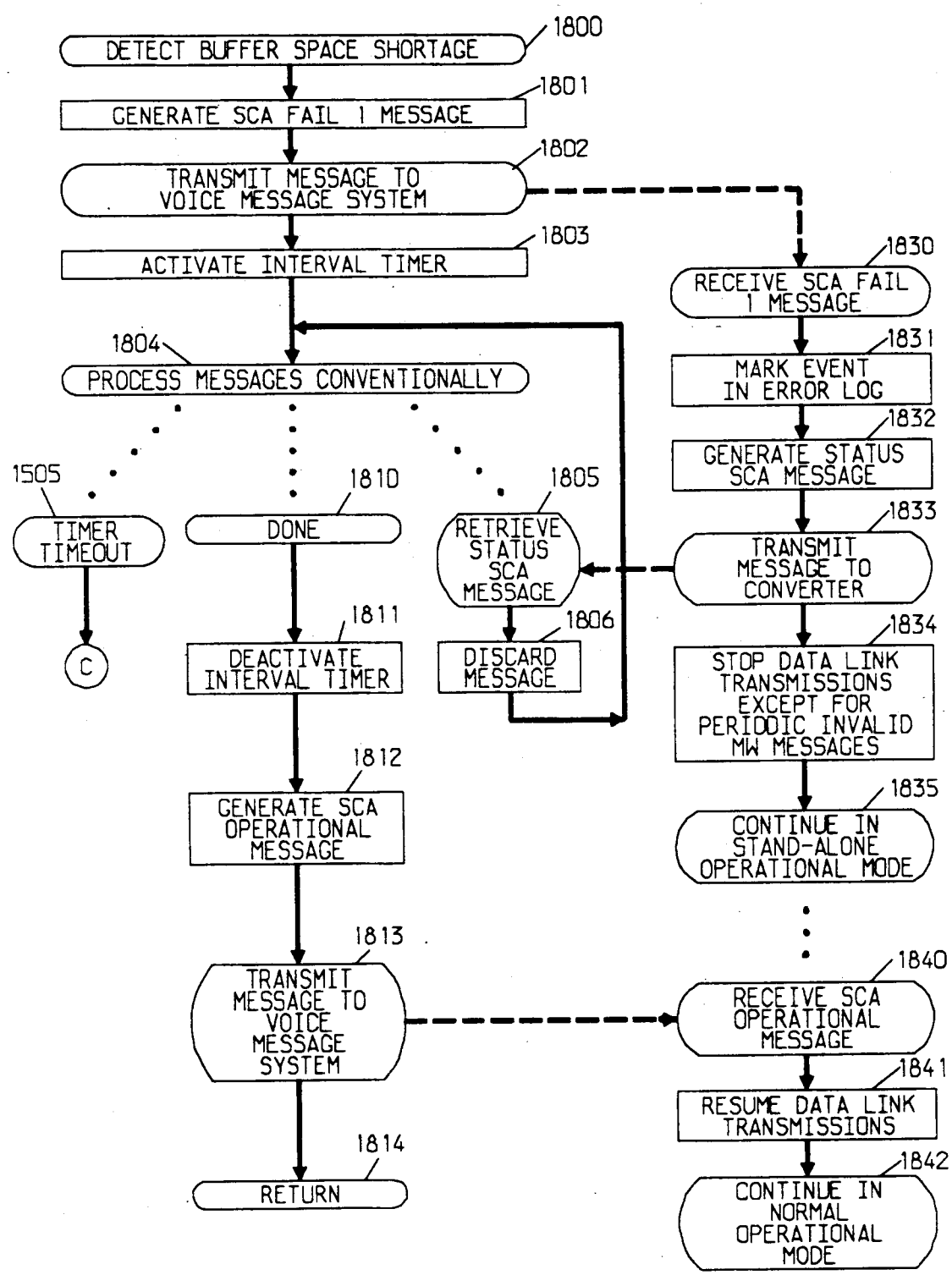
FIG. 17 is a flow diagram of the operations performed by the protocol converter and the voice message system of FIG. 1 in using a message of FIG. 14 and the message of FIG. 16.

The use of messages 1400 and 1600 is illustrated in FIG. 17. Converter 15 monitors buffer 45 for shortage of storage space. A shortage may occur when a certain threshold percentage of the buffer 45 storage locations is occupied, so that buffer 45 has room for receipt of only a limited number of messages (e.g., one). When converter 15 detects shortage of storage space in buffer 45, at step 1800, it generates SCA FAIL 1 message 1600, at step 1801, and transmits it to system 11, at step 1802. Converter 15 then activates a 5-minute interval timer of timers 46, at step 1803, and proceeds to try to process all of the buffered messages before the timer times out, at step 1804.

In response to receiving the SCA FAIL 1 message, at step 1830, system 11 records a number that identifies the reported event in its conventional error log 60 in order to mark the occurrence of the event, at step 1832. System 11 then generates a STATUS SCA message 1700, at step 1832 and transmits it to converter 15, at step 1833. STATUS SCA message 1700 is discussed below in conjunction with FIG. 18. Following step 1833, system 11 stops transmitting on link 12 all messages except for the periodic invalid MW messages that are used to monitor the continued viability of link 12, at step 1834. And, at step 1835, system 11 continues its operation in the conventional "stand-alone" operational mode, wherein it dispenses with the use of data link 12 and instead obtains the information that it needs in order to serve callers directly from the callers, by prompting them.

STATUS SCA message 1700 transmitted at step 1833 joins other received by unprocessed messages from system 11 in buffer 45 of converter 15. When converter 15 finishes processing the messages received prior to STATUS SCA message 1700, it retrieves STATUS SCA message 1700 from buffer 45, at step 1805, but merely discards it, at step 1806, without further processing, and returns to step 1804 to process messages received after STATUS SCA message 1700.

If converter 15 is not able to clear the backlog of unprocessed messages from buffer 45 before the timer that it activated at step 1803 times out, it is taken as an error in converter 15 operation. Converter 15 therefore undertakes a reset operation, by going to step 2000 of FIG. 24, discussed below.

If and when converter 15 completes processing all messages that are in buffer 45 prior to timeout of the timer that it activated at step 1803, at step 1810, it is ready to return to normal operation. Converter 15 therefore deactivates the timer that it activated at step 1803, at step 1811; generates an SCA OPERATIONAL message 1700, at step 1812; and transmits the generated message to system 11, at step 1813. Converter 15 then returns to normal operation, at step 1814.

Receipt of SCA OPERATIONAL message 1700, at step 1840, notifies system 11 of elimination of the backlog of unprocessed messages in buffer 45 of converter 15. System 11 therefore resumes normal data link transmissions that it had suspended at step 1834, at step 1841, and resumes its normal mode operation that it had suspended at step 1835, at step 1842.

Both converter 15 and system 11 have their own diagnostic capabilities. When the diagnostics detect problems affecting link 12, converter 15 and system 11 cooperate in maintenance and reset procedures, shown in FIGS. 21-22 and 24, by means of maintenance messages shown in FIGS. 18-20 and 23, to alleviate the problem and restore link 12 to normal operation.

Figure 21:
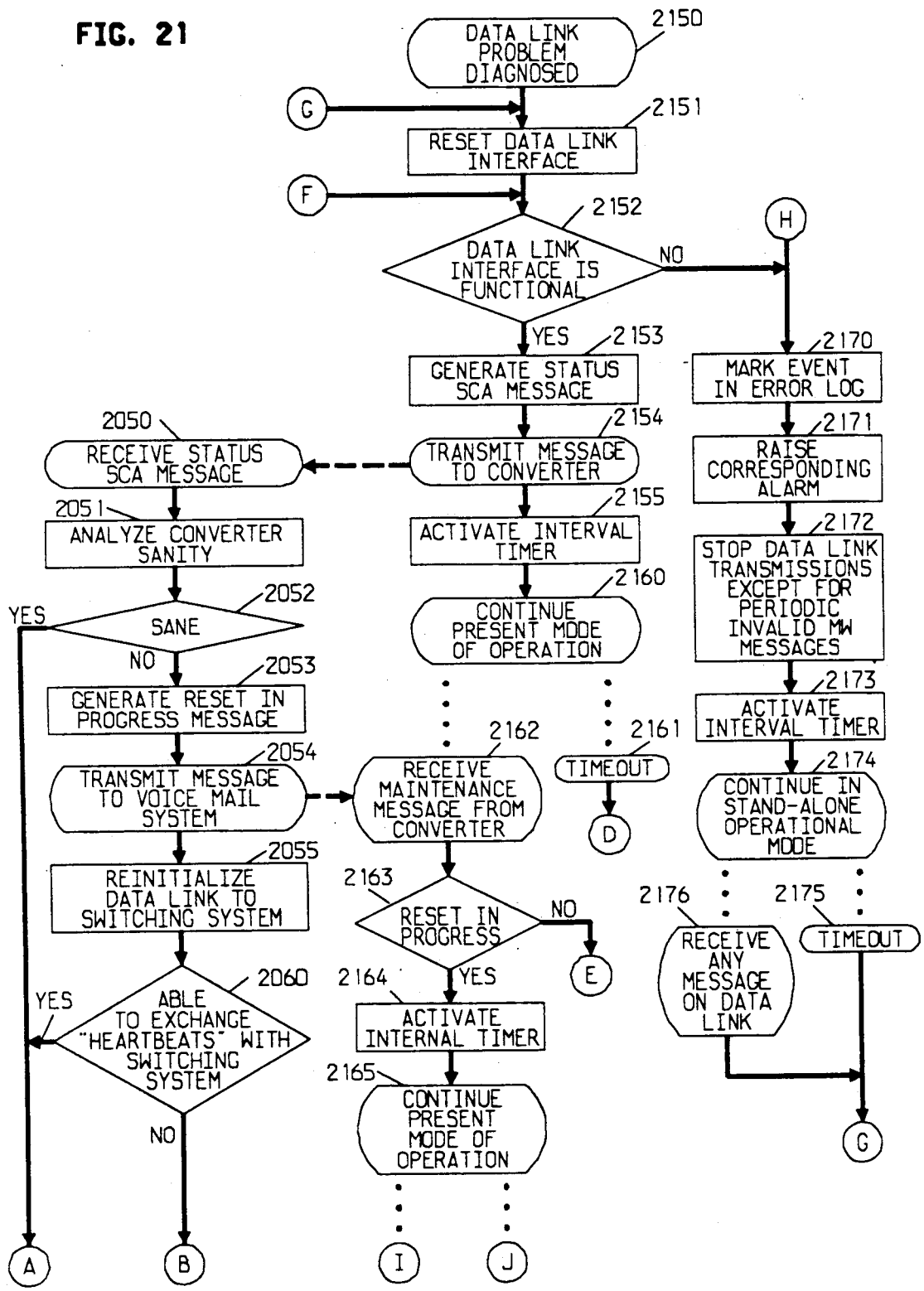

FIGS. 21-22 show the procedure initiated by system 11. When system 11 diagnoses a problem with link 12, at step 2150, it responds by resetting data link interface 50, at step 2151. System 11 then checks whether the reset has rendered link interface 50 functional, at step 2152. If not, system 11 marks the appropriate event in its error log 60, at step 2170, raises the corresponding alarm to the craft, at step 2171, and stops transmitting messages on link 12 except for the periodic invalid MW messages, at step 2172. System 11 then activates a 12-minute interval timer of timers 51, at step 2173, and continues operation in a stand-alone, data link-less, mode, at step 2174. Either timeout of the timer that was activated at step 2173, at step 2175, or receipt of any message on data link 12, at step 2176, causes system 11 to return to step 2151 to again reset data link interface 50 in order to verify that link 12 is functional.

Returning to step 2152, if resetting of data link interface 50 is found to render data link interface 50 functional, system 11 generates a STATUS SCA message 1700 shown in FIG. 18, at step 2153, and transmits it to converter 15 across data link 12, at step 2154. Turning briefly to FIG. 18, message 1700 takes the form of message 300 of FIG. 3. It carries the ASCII character sequence <S><T><A><T><U><S><sp><S><C><A> in message ID field 301, and serves as a command to converter 15 to analyze its sanity.

Returning to FIG. 21, following transmission of message 1700 at step 2154, system 11 activates a one-minute interval timer of timers 51, at step 2155, and then continues in its present mode of operation, at step 2160, be it the stand-alone or the normal mode. If the timer that was activated at step 2155 times out, at step 2161, before system 11 receives a maintenance message from converter 15, system 11 proceeds to step 2197 and checks whether this is the first timeout to have sent system 11 to this point. If not, system 11 proceeds to step 2170 discussed above; if so, system 11 runs a conventional loop-around test on data link interface 50, at step 2198, and then proceeds to step 2152, also discussed above.

Returning to step 2154 and turning to the operation of converter 15, receipt by converter 15 of STATUS SCA message 1700 that was transmitted by system 11 at step 2154, at step 2050, causes converter 15 to analyze its own sanity, at step 2051. If it determines, at step 2052, that it is sane, converter 15 generates SCA OPERATIONAL message 1600 shown in FIG. 16 and discussed previously, at step 2061, transmits the message to system 11 on data link 12, at step 2062, and then continues its normal operation, at step 2063. But if it determines at step 2052 that it is not sane, converter 15 generates a RESET IN PROGRESS message 1900 shown in FIG. 19, at step 2053, and transmits it to system 11 on data link 12, at step 2054. Turning briefly to FIG. 19, message 1900 takes the form of message 200 of FIG. 2. It carries the ASCII character sequence <R><E><S><E><T><sp><I><N><sp><P-><R><O><G><R><E><S><S> in message ID field 201, and serves to inform system 11 that reset of data link 12 is taking place.

Returning to FIG. 21, following transmission of message 1900 at step 2054, converter 15 reinitializes portion 31 of data link 12, at step 2055, and then checks whether it is able to exchange conventional, switch-converter protocol, "heartbeats" with switching system 10, at step 2060. If so, converter 15 proceeds to step 2061 to inform system 11 that it is operational; if not, converter 15 generates an ISDN FAIL X message 2200 shown in FIG. 20, at step 2064, and transmits it over data link 12 to system 11, at step 2064. Turning briefly to FIG. 20, message 2200 takes the form of message 200 of FIG. 2. It carries the ASCII character sequence <I><S-><D><N><sp><F><A><I><L><sp> in message ID field 201, and an ASCII numerical character in data field 202 that identifies the reason for the failure. The numerical values for the data field 202 character, and their meanings, are as shown in Table 1.

TABLE 1

| character value | meaning |
| --- | --- |
| 0 | protocol converter failed layer 1 protocol |
| 1 | protocol converter was able to communicate with the ISDN interface of the switching system, but failed to communicate with ISDN software |
| 2 | protocol converter was able to communicate with the ISDN interface software, but failed to communicate with packet protocol software |
| 3 | protocol converter was able to communicate with ISDN and packet protocol software, but line card equipment numbers are improperly assigned |
| 4 | protocol converter was unable to establish packet communications with packet protocol software due to timeout of waiting period for confirmation of establishment request |
| 5 | protocol converter was unable to exchange "heartbeats" with the switching system after communications had been established |

Returning to FIG. 22, following transmission of message 2200 at step 2065, converter 15 activates a 5-minute interval timer of timers 46, at step 207, and commences conventional maintenance activities in an attempt to regain normal functionality, at step 2071. If the timer that was activated at step 2070 times out, at step 2072, before functionality is regained, converter 15 proceeds to step 2000 of FIG. 24 to reset itself. But, if functionality is regained, at step 2073, before the timer that was activated at step 2070 times out, converter 15 continues its normal operation, at step 2074.

Returning to consideration of system 11 operation at step 2160, if system 11 receives, at step 2162, a maintenance message from converter 15 before the one minute timer that was activated at step 2155 times out, system 11 checks, at step 2163, whether the received message is RESET IN PROGRESS message 1900 (see steps 2053 and 2054). If so, system 11 activates a 5-minute interval timer of timers 51, at step 2164, and continues its present mode of operation, at step 2165. If the timer that was activated at step 2164 times out, at step 2180, before system 11 receives another maintenance message from converter 15, system 11 proceeds to step 2197, discussed previously. But if system 11 receives, at step 2181, a maintenance message (e.g., one of the messages 1600 or 2200 that was sent at step 2062 or 2065) before the timer that was activated at step 2164 times out, system 11 checks whether the received message is ISDN FAIL message 2200, at step 2182. If so, system 11 proceeds to step 2170, discussed previously; if not, system 11 proceeds to test the functionality of data link 12 in the manner disclosed in the application of O'Dell et al., identified above. Specifically, system 11 generates an invalid MW message, at step 2183; transmits it to switching system 10 via data link 12 and converter 15, at step 2184, to elicit a response from switching system 10; activates a 30-second interval timer of timers 51, at step 2185; and continues its present mode of operation, at step 2190. If the timer that was activated at step 2185 times out, at step 2191, before system 11 receives an IMW message from system 10, system 11 proceeds to step 2197, discussed previously. If system 11 receives an IMW message, at step 2192, prior to timeout of the timer that was activated at step 2185, data link 12 is considered to be fully functional and so system 11 clears all alarms that it had set (e.g., at step 2171), at step 2193, resumes normal transmissions on data link 12, at step 2194, and continues operation in the normal, data link-using, operational mode, at step 2196.

Figure 24:
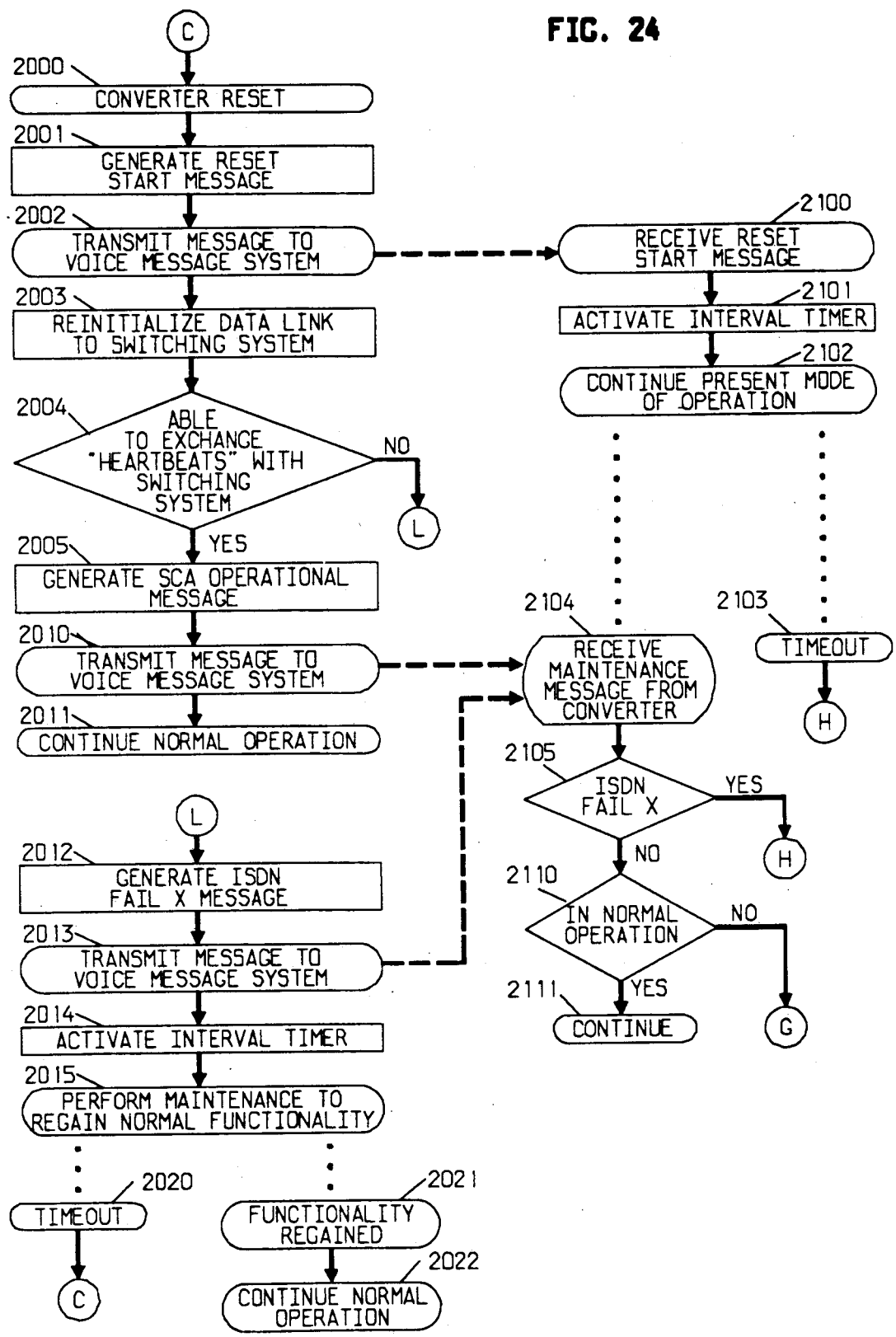
FIG. 24 is a flow diagram of the operations performed by the protocol converter and the voice message system of FIG. 1 in using the messages of FIGS. 20 and 23.

The maintenance operations described in conjunction with FIGS. 21 and 22 were triggered by action of system 11. Converter 15 may trigger a similar sequence of operations, as shown in FIG. 24. When converter 15 resets for any reason, at step 2000, it generates a RESET START message 2300 shown in FIG. 23, at step 2001, and sends it to system 11 over data link 12, at step 2002. Turning briefly to FIG. 23, message 2300 takes the form of message 200 of FIG. 2. It has the ASCII character sequence <R><E><S><E><T><sp><I><N><sp><P><R><O><G><R><E><S><S> in message ID field 201, and serves to inform system 11 of the reset of converter 15.

Returning to consideration of FIG. 24, following the transmission of RESET START message 2300 at step 2002, converter 15 undertakes activities at steps 2003–2022 that duplicate steps 2055–2074 of FIGS. 21–22.

In response to receipt of RESET START message 2300, at steps 2100, system 11 activates a 5-minute interval timer of timers 51, at step 2101, and then continues its present mode of operation, at step 2102. If the timer that was activated at step 2101 times out, at step 2103, before system 11 receives another maintenance message from converter 15, system 11 proceeds to step 2170 of FIG. 21. If system 11 receives a maintenance message (e.g., one of the messages 1600 or 2200 sent at step 2010 or 2013), at step 2104, prior to timeout of the timer that was activated at step 2101, system 11 checks whether the received message is an ISDN FAIL X message 2200, at step 2105. If so, system 11 proceeds to step 2170 of FIG. 21; if not, system 11 checks whether it is operating in the normal, data link-using, mode of operation, at step 2110. If system 11 is in the normal mode of operation, it merely continues that operational mode, at step 2111. If system 11 is not in the normal mode of operation, it proceeds to step 2151 of FIG. 21 to try and restore the normal mode.

Of course, it should be understood that various changes and modifications may be made to the above-described illustrative embodiment of the invention. For example, suitable ASCII character strings other than those specified herein may be used in the messages' message ID and data fields. Or, use other than that described herein may be made of the messages. Such changes and modifications may be made without departing from the spirit and the scope of the invention. It is therefore intended that such changes and modifications be covered by the following claims.

We claim:

1. In a method of communicating via SMSI protocol messages to perform predetermined actions and including the steps of transmitting and receiving SMSI protocol messages on a link at a telecommunication switching system adjunct processor, the improvement comprising the steps of:

receiving on the link at the adjunct processor a digital data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting a failure condition; and stopping the transmitting on the link of valid SMSI protocol messages and causing the adjunct processor to operate in a stand-alone, data link-less, mode of operation, in response to receipt of the failure condition-reporting message.

2. The method of claim 1 further comprising the steps of:

receiving on the link a second digital data message having the format of a message of the SMSI protocol including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting cessation of the failure condition; and resuming the transmission on the link of valid SMSI protocol messages and causing the adjunct processor to resume operating in a normal, data link-dependent, mode of operation, in response to receipt of the second message.

3. The method of claim 1 wherein the failure condition reported by the message is shortage of storage space for buffering messages transmitted on the link by the adjunct processor.

4. In a method of communicating via SMSI protocol messages at a telecommunication system protocol converter and including the steps of receiving SMSI protocol messages that have been transmitted on a digital data communication link, converting the received SMSI protocol messages into non-SMSI protocol messages, and transmitting the converted messages on the link, the improvement comprising the steps of:

generating a data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting a failure condition, in response to occurrence of a failure condition; and transmitting the generated message on the link in digital form to stop the transmitting on the link of valid SMSI protocol messages.

5. The method of claim 4 further comprising the steps of:

generating a second data message having a format of a message of the SMSI protocol including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting cessation of the failure condition, in response to cessation of occurrence of the failure condition; and transmitting the generated message on the link in digital form to resume the transmission on the link of valid SMSI protocol messages.

6. The method of claim 4 wherein
the failure condition reported by the message is shortage of storage space in the protocol converter for buffering messages received on the link and having a format of the SMSI protocol messages.

7. In a method of communicating on a digital communication link and including the steps of transmitting SMSI protocol messages from an adjunct processor on the link to perform predetermined actions, receiving the SMSI protocol messages that have been transmitted on the link at a protocol converter, converting the received SMSI protocol messages into non-SMSI protocol messages at the protocol converter, and transmitting the converted messages on the link from the protocol converter, the improvement comprising the steps of:

generating at the protocol converter a first data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting a failure condition, in response to occurrence of a failure condition;

transmitting the generated message on the link in digital form from the protocol converter; and stopping the transmitting on the link of valid SMSI protocol messages and operating the adjunct processor in a stand-alone, data link-less, mode of operation, in response to receipt of the first data message at the adjunct processor.

8. The method of claim 7 further comprising the steps of:

generating at the converter a second data message having the format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting cessation of the failure condition, in response to cessation of occurrence of the failure condition;

transmitting the generated message on the link in digital form from the converter; and resuming the transmission on the link of valid SMSI protocol messages and resuming operating in a normal, data link-dependent, mode of operation, in response to receipt of the second data message at the adjunct processor.

9. The method of claim 7 further comprising the steps of temporarily storing messages received on the link and having a format of the SMSI protocol messages in a buffer in the protocol converter, removing from the buffer and converting at the converter at least some of the stored messages into messages having a format of a non-SMSI protocol, and transmitting the converted messages on the link; wherein the steps of generating and transmitting the first data message comprise the step of generating and transmitting on the link the first data message, in response to shortage of free storage space in the buffer.

10. In a method of communicating on a digital data link via SMSI protocol messages to perform predetermined actions and including the steps of transmitting and receiving on the link SMSI protocol messages at a telecommunication switching system adjunct processor, the improvement comprising the steps of:

receiving at the adjunct processor a first digital data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting a reset condition;

awaiting receipt within a predetermined period of a second digital data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting an operative condition, in response to the receipt of the first digital data message; and stopping the transmitting on the data link of valid SMSI protocol messages and causing the adjunct processor to operate in a stand-alone, data linkless, mode of operation, in response to lack of receipt of the second message within the predetermined period.

11. The method of claim 10 further comprising the steps of:

generating at the adjunct processor a third data message having a format of an SMSI protocol message including a plurality of fields including a message ID field and a data field, an end-of-message field marking the end of the message, and a delimiter field separating the message ID and data fields from the end-of-message field, the delimiter field including an ASCII exclamation mark character, the message ID and data fields including ASCII characters identifying the message as a status inquiry message; and transmitting the third digital data message on the link in digital form to stimulate receipt by the adjunct processor of at least one of the first and the second digital data messages.

12. In a method of communicating via SMSI protocol messages at a telecommunication system protocol converter and including the steps of converting at least some messages received by the converter on a part of a digital data communication link between a non-SMSI protocol and an SMSI protocol and transmitting the converted messages from the converter on another part of the link, the improvement comprising the steps of:

determining whether a first part of the link is operative, in response to a reset of the converter;

generating a first data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting a reset condition;

transmitting the first data message on a second part of the link in digital form;

generating a second data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting an operative condition, in response to a determination that the first part of the link is operative;

transmitting the second data message on the second part of the link in digital form;

generating a third data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting an inoperative condition, in response to a determination that the first part of the link is inoperative; and transmitting the third data message on the second part of the link in digital form.

13. The method of claim 12 further comprising the steps of:

receiving a fourth digital data message having a format of an SMSI protocol message including a plurality of fields including a message ID field and a data field, an end-of-message field marking the end of the message, and a delimiter field separating the message ID and data fields from the end of message field, the delimiter field including an ASCII exclamation mark character, the message ID and data fields including ASCII characters identifying the message as a status inquiry message;

determining sanity of the protocol converter, in response to receipt of the fourth digital data message;

generating and transmitting the second data message on the second part of the link, in response to a determination that the converter is sane; and generating and transmitting the first data message on the second part of the link and determining whether a first part of the link is operative, in response to a determination that the converter is insane.

14. A method of communicating on a digital communication link having a first and a second part in a telecommunication system including an adjunct processor connected to the second part of the link for transmitting and receiving on the link SMSI protocol messages to perform predetermined actions, and a protocol converter connected to the link for converting at least some messages received on a part of the link between a non-SMSI protocol and an SMSI protocol and transmitting the converted messages on another part of the link, the method comprising the steps of:

determining at the converter whether a first part of the link is operative, in response to a reset of the converter;

generating and transmitting on a second part of the link a first digital data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting a reset condition;

generating and transmitting on the second part of the link a second digital data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting an operative condition, in response to a determination that the first part of the link is operative;

generating and transmitting on the second part of the link a third digital data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID and data fields including ASCII characters identifying the message as one reporting an inoperative condition, in response to a determination that the first part of the link is inoperative;

awaiting receipt within a predetermined period of the second digital data message, in response to receipt by the adjunct processor of the first digital data message; and stopping the transmitting on the data link of valid SMSI protocol messages and causing the adjunct processor to operate in a stand alone, data linkless, mode of operation, in response both to lack of receipt within the predetermined period of the second message and to receipt of the third message.

15. The method of claim 14 further comprising the steps of:

generating at the adjunct processor and transmitting a fourth digital data message having a format of an SMSI protocol message including a plurality of fields including a message ID field and a data field, an end-of-message field marking the end of the message, and a delimiter field separating the message ID and data fields from the end of message field, the delimiter field including an ASCII exclamation mark character, the message ID and data fields including ASCII characters identifying the message as a status inquiry message;

determining sanity of the protocol converter, in response to receipt of the fourth digital data message at the protocol converter;

generating and transmitting the second digital data message on the second part of the link, in response to a determination that the converter is sane; and generating and transmitting the first digital data message on the second part of the link and determining whether a first part of the link is operative, in response to a determination that the converter is insane.

16. In a method of communicating at a telecommunication switching system adjunct processor on a digital data communication link via SMSI protocol messages to perform predetermined actions, the improvement comprising the steps of:

receiving at the adjunct processor from the link a digital data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID field including ASCII characters identifying the message as an event-reporting message that reports occurrence of at least one predetermined event affecting functionality of the link; and recording the event reported by the received message in the adjunct processor in a log of events affecting functionality of the link, in response to receipt of the event-reporting message.

17. The method of claim 16 wherein the at least one predetermined event comprises:

a loss on the link of a message having a non-SMSI protocol; and a loss on the link of a message having a format of an SMSI protocol message.

18. The method of claim 16 of communicating on a digital data communication link comprising a plurality of link portions, wherein the at least one predetermined event comprises:

set up of a link portion; and tear down of a link portion.

19. The method of claim 16 wherein the at least one predetermined event comprises:

a failure to receive on the link within a predetermined time interval a message having a format of an SMSI protocol message.

20. The method of claim 16 wherein the at least one predetermined event comprises:

a shortage of storage space for buffering messages transmitted on the link by the adjunct processor.

21. In a method of communicating via SMSI protocol messages at a telecommunication system protocol converter and including the steps of converting at least some messages received on a digital data communication link between a non-SMSI protocol and a SMSI protocol and transmitting the converted messages on the link, the improvement comprising the steps of:

generating a data message having a format of an SMSI protocol message including a plurality of fields including an end-of-message field marking the end of the message and a pair of delimiter fields surrounding a message ID field and a data field, each delimiter including an ASCII carriage return character and an ASCII line feed character, the message ID field including ASCII characters identifying the message as an event-reporting message that reports occurrence of predetermined events, in response to occurrence of a predetermined event affecting functionality of the link; and transmitting the generated data message on the link in digital form, to cause the event reported by the message to be recorded by a recipient of the message in a log of events affecting functionality of the link.

22. The method of claim 21 wherein the predetermined events include:

a failure by the converter to receive on the link a message having a non-SMSI protocol; and a failure by the converter to receive on the link a message having a format of an SMSI protocol message.

23. The method of claim 21 of communicating on a digital data communication link comprising a plurality of link portions, wherein the predetermined events include:

set up of a link portion; and tear down of a link portion.

24. The method of claim 21 wherein the predetermined events include:

a failure of the protocol converter to receive on the link within a predetermined time interval a message having a format of an SMSI protocol message.

25. The method of claim 21 wherein the predetermined events include:

a shortage of storage space in the protocol converter for buffering messages received on the link and having a format of an SMSI protocol message.

26. A method of communicating on a digital data communication link in a telecommunication system including a protocol converter connected to the link for converting at least some messages received on the link between a non-SMSI protocol and an SMSI protocol and transmitting the converted messages on the link, and an adjunct processor connected to the link and communicating on the link via SMSI protocol messages to perform predetermined actions, the method comprising the steps of:

generating and transmitting on the link in digital form a data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID field including ASCII characters identifying the message as an event-reporting message that reports occurrence of a predetermined event, in response to occurrence of a predetermined event affecting functionality of the link; and recording the event reported by the received message in a log of events affecting functionality of the link, in response to receipt of the event-reporting message.

27. The method of claim 26 wherein
the predetermined events include:
a loss by the converter on the link of a message having a non-SMSI protocol; and
a loss by the converter on the link of a message having a format of an SMSI protocol message.

28. The method of claim 26 of communicating on a digital data link that comprises a plurality of link portions, wherein
the predetermined events include:
set up of a link portion, and
tear down of a link portion.

29. The method of claim 26 wherein
the predetermined events include:
a failure of the converter to receive a message on the link from the adjunct processor within a predetermined time interval.

30. The system of claim 26 wherein
the predetermined events include:
a shortage of storage space in the converter for buffering messages received on the link from the adjunct processor.

31. A method of controlling at least one indicator, each indicator representing a predetermined condition and having a plurality of states each corresponding to a different state of the represented condition, in a telecommunication switching system wherein SMSI protocol messages are communicated to perform predetermined actions, the method comprising the steps of:

generating a data message having a format of an SMSI protocol message including a plurality of fields including a message ID field and a data field, an end-of-message field marking the end of the message, and a delimiter field separating the message ID and data fields from the end of message field, the delimiter field including an ASCII exclamation mark character, the message ID field including ASCII characters identifying the message as an indicator control message and the data field including an ASCII character for each indicator, each included ASCII character in the data field specifying a new state of the corresponding indicator, in response to occurrence of an event changing a present state of a represented condition to a new state; and transmitting the generated message on a digital data communication link in digital form to the at least one indicator to change the state of the indicator representing the condition whose state was changed by the occurred event, from a present state to the new state specified by the indicator's corresponding ASCII character in the data field.

32. A method of communicating at a telecommunication system protocol converter for converting at least some received messages between a non-SMSI protocol and an SMSI protocol and transmitting the converted messages, and having at least one indicator, each indicator representing a predetermined condition and having a plurality of states each corresponding to a different state of the represented condition, the method comprising the steps of:

receiving a digital data message having a format of an SMSI protocol message including a plurality of fields including a message ID field and a data field, and end-of-message field marking the end of the message, and a delimiter field separating the message ID and data fields from the end of message field, the delimiter field including an ASCII exclamation mark character, the message ID field including ASCII characters identifying the message as an indicator control message and the data field including an ASCII character for each indicator, each included ASCII character in the data field specifying a new state of the corresponding indicator; and changing the state of the indicator representing the condition whose state was changed by the occurred event, from a present state to the new state specified by the indicator's corresponding ASCII character in the data field, in response to receipt of the digital data message.

33. A method of communicating on a digital communication link in a telecommunication system having at least one indicator, each indicator representing a predetermined condition and having a plurality of states each corresponding to a different state of the represented condition, an adjunct processor connected to the link and communicating on the link via SMSI protocol messages to perform predetermined actions, and a protocol converter connected to the at least one indicator and to the link for converting at least some messages received on the link between a non-SMSI protocol and an SMSI protocol and transmitting the converted messages on the link, the method comprising the steps of:

generating at the adjunct processor a data message having a format of an SMSI protocol message including a plurality of fields including a message ID field and a data field, an end-of-message field marking the end of the message, and a delimiter field separating the message ID and data fields from the end of message field, the delimiter field including an ASCII exclamation mark character, the message ID field including ASCII characters identifying the message as an indicator control message and the data field including an ASCII character for each indicator, each included ASCII character in the data field specifying a new state of the corresponding indicator, in response to occurrence of an event changing a present state of a represented predetermined condition to a new state;

transmitting the generated message on the link in digital form;

receiving at the converter the message generated and transmitted by the adjunct processor; and changing the state of the indicator representing the condition whose state was changed by the occurred event, from a present state to the new state specified by the indicator's corresponding ASCII character in the data field, in response to receipt of the message.

34. In a method of communicating via SMSI protocol messages at a telecommunication switching system adjunct processor and including the steps of receiving SMSI protocol messages from a digital data communication link and taking predetermined action in response to receipt of the SMSI protocol messages, the improvement comprising the steps of:

receiving from the link a digital data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID field including ASCII characters identifying the message as a leave word calling request message and the data field including ASCII characters identifying a calling and a called party;

storing a message for the called party that identifies the calling party, in response to receipt of the leave word calling request message; and notifying the called party of existence of a stored message, in response to the storing of the message.

35. The method of claim 34 further comprising the steps of:

receiving from the link a digital data message having the format of a message of the SMSI protocol including the plurality of fields including the end-of-message field marking the end of the message and the pair of delimiter fields surrounding a message ID field and a data field, each delimiter field including the ASCII carriage return character and the ASCII line feed character, the message ID field including ASCII characters identifying the message as a leave word calling cancel message and the data field including ASCII characters identifying the calling and the called party;

deleting the stored message for the called party that identifies the calling party, in response to receipt of the leave word calling cancel message; and selectively ceasing to notify the called party of the existence of a stored message, in response to the deletion of the stored message.

36. A method of communicating in a telecommunication system having a switching system for transmitting messages having a format of a non-SMSI protocol, including a leave word calling request message, a protocol converter connected to the switching system and responsive to receipt of the messages transmitted by the switching system for converting at least some of the received messages into SMSI protocol messages, and an adjunct processor connected to the protocol converter for taking predetermined action in response to receipt of the SMSI protocol messages, the method comprising the steps of:

transmitting from the switching system a leave word calling message having the format of the non-SMSI protocol;

converting the leave word calling message at the protocol converter into a digital data message having a format of an SMSI protocol message including a plurality of fields including an end-of-message field marking the end of the message and a pair of delimiter fields surrounding a message ID field and a data field, each delimiter field including an ASCII carriage return character and an ASCII line feed character, the message ID field including ASCII characters identifying the message as a leave word calling request message and the data field including ASCII characters identifying a calling and a called party, in response to receipt of the leave word calling request message; and storing a message for the called party that identifies the calling party and notifying the called party of existence of a stored message, in response to receipt of the converted leave word calling request message.

37. The method of claim 36 further comprising the steps of:

transmitting from the switching system a leave word calling cancel message having the format of the non-SMSI protocol;

converting the leave word calling cancel message at the protocol converter into a digital data message having the format of a message of the SMSI protocol including the plurality of fields including the end-of-message field marking the end of the message and the pair of delimiter fields surrounding a message ID field and a data field, each delimiter field including the ASCII carriage return character and the ASCII line feed character, the message ID field including ASCII characters identifying the message as a leave word calling cancel message and the data field including ASCII characters identifying the calling and the called party, in response to receipt of the leave word calling cancel message; and deleting at the adjunct processor the stored message for the called party that identifies the calling party, and selectively ceasing to notify the called party of existence of a stored message, in response to receipt of the converted leave word calling cancel message.

* * * * *